Patented Aug. 14, 1945

2,381,880

UNITED STATES PATENT OFFICE 2,381,880

ESTER

Martin E. Cupery, Wilmington, Del., assignor to E. I. du Pont de Nemours & Company, Wilmington, Del., a corporation of Delaware No Drawing. Application December 30, 1940, Serial No. 372,391

15 Claims. (Cl. 106—287)

This invention relates to new synthetic drying oils and to coating compositions containing them.

Of the natural drying oils, China-wood oil, perilla oil, and oiticica oil are outstanding in their ability to form hard, tack-free, water-resistant films when properly formulated into varnish and enamel compositions. Unfortunately, however, these oils are not produced in this country in substantial quantities and have to be imported. This difficulty is increased by the fact that they are subject to wide fluctuations in price, availability, and quality. Also, as is well known, some of these oils have a tendency to form films that "crystallize" or "frost."

Extensive research has therefore been expended in an effort to develop synthetic compositions which possess the drying properties and film-forming characteristics of these natural drying oils, and in a further endeavor to produce synthetic drying compositions which have even better properties and more uniform quality than the natural drying oils. Such prior attempts, however, have in the main been unsuccessful in producing synthetic drying oils which have properties superior to the natural drying oils, or have been uneconomical in that the materials produced have been so expensive they could have no practical commercial use.

This invention has as its general objective the preparation of new esters which can be substituted for the rapidly drying natural fatty oils in coating compositions into which fatty oils are ordinarily formulated.

Another objective is the preparation of new esters having film-forming properties, especially drying rates, hardness, and toughness, of about the same order as, or better than, those of the natural drying oils.

A further objective is the proper combination of polyhydric alcohol and monocarboxylic acids which will give esters having such properties.

A still further objective is the preparation of esters from those monocarboxylic acids which have the particular types of polyunsaturation, and other elements of chemical structure, which will impart rapid drying film properties to said esters.

Another general objective is the preparation of esters, suitable for use in coating compositions, from acids which are available economically or may be made so readily.

An additional objective is the provision of methods for making these new esters.

The above and other objects appearing hereinafter are accomplished by preparing, for example, by one of the methods subsequently described in detail, a polyhydric alcohol mixed ester, the acidic radicals of which comprise the radical of a so-called "super-drying acid," as defined below, and the radical of at least one different monofunctional monocarboxylic acid, i. e., an acid having a structure different from that set forth below for a "super-drying acid."

The term "monofunctional" means that the monocarboxylic acid contains no group capable of undergoing reaction with the carboxyl group under normal esterification conditions; i. e., acids having an OH, $NH_2$, or NHR group would not be suitable. These different monofunctional monocarboxylic acids are preferably unsaturated, the acids of natural drying or semi-drying oils being most useful.

By the term "super-drying acid," as used herein, is meant a monocarboxylic acid which has ethylene double bonds actually or potentially in the 2 and 4 positions (i. e., having or capable of having under conditions of use the partial structure —C=C—C=C—COOH), and in which the ethylenic carbon atoms that are in direct conjugation with the carboxyl group are each attached to no more than one hydrogen atom. It will be understood that the term "super-drying" does not mean that the acid itself is film-forming.

The acids referred to in the preceding paragraph convey to their polyhydric alcohol mixed esters, in which the other acid is derived from a natural drying or semi-drying oil, the ability to dry at a more rapid rate to films of improved quality as compared to the corresponding natural oil. These acids, when used in the proper amounts, also convey to their polyhydric alcohol mixed esters, in which the other acid is of a type other than natural drying or semi-drying oil acids, the ability to dry. Hence, such acids may be referred to conveniently as "super-drying acids."

In one of the preferred methods of carrying out the invention, the super-drying acid is reacted with the polyhydric alcohol which has been partially esterified with the different acid or acids. When these polyhydric alcohol partial esters are glycerol partial esters of a long chain fatty acid, they are most suitably obtained by heating fatty oils in the usual way with glycerol and preferably an ester-interchange catalyst. In carrying out this alcoholysis step, the oil and free polyhydric alcohol, in proportions calculated to give the degree of alcoholysis desired, are placed along with a small amount of an alcoholysis catalyst (e. g., 0.01-0.1% litharge based on the oil) in a reactor fitted with an agitator, a device to measure the temperature, and a gas inlet. The mixture is then heated with stirring for 1-2 hours at about 200-225° C., a deoxidized inert gas such as carbon dioxide or nitrogen being passed into and over the mixture. In order to esterify this polyhydric alcohol partial ester with the super-drying acid, the partial ester is cooled to about 140-160° C., and the super-drying acid introduced in approximately that amount sufficient to esterify the free hydroxyl groups calculated to be present from the initial proportions of oil and polyhydric alcohol. A hydrocarbon solvent such as xylene is next added in amount sufficient to produce boiling when the reaction temperature reaches about 200° C. The distilling vapors of solvent and water of esterification are passed through a downward condenser, the water separated mechanically from the condensed liquids, and the solvent returned to the reaction vessel, the whole cycle of distillation, separation of water, and return of solvent being conducted in a continuous manner. Depending on the temperature of reaction, which in turn is governed by the nature and amount of solvent employed, the reaction is usually completed within about 4-16 hours; thus, when the temperature is around 200° C., the process is usually complete within 11-12 hours. There is obtained a solution of the new drying oil, from which the solvent can be removed by distillation if desired. The resulting oil, or its solution as obtained in the process, can be formulated, by conventional methods used with natural drying oils, into valuable coating compositions. For such purposes, it can be used alone, or in blends with resins and/or natural drying or semi-drying oils.

In preparing the esters of the present invention, certain precautions are necessary in order to obtain satisfactory results from a number of standpoints. These precautions are made necessary by the high reactivity of the super-drying acid, particularly at the elevated temperatures required in the preparation of the esters. As is noted above, and as will be seen from the examples, one such precaution is the maintenance of an inert atmosphere by the use of an oxygen-free inert gas. By complete or essentially complete exclusion of oxygen, superior color is obtained, while, if the reaction is carried out at high temperature in the presence of oxygen, poorer color, combined with decomposition and sometimes inferior drying, is encountered. To obtain light-colored products, it is also necessary to avoid use of materials which liberate oxygen under reaction conditions. Thus, solvents employed should not be those which contain or give off free oxygen or similar active products during the reaction. For example, aged turpentine or old samples of petroleum naphtha should not be used since the peroxides usually present in these materials produce deleterious effects. Other oxygen-yielding compounds, for example, oxidized drying oils, should be excluded in order to insure good color, and to avoid degradation and gelation of the resulting compositions.

The more detailed practice of the invention is illustrated in the following examples wherein the amounts of the ingredients are by weight, such examples being given by way of illustration and not as a limitation. In these examples, viscosities and colors are given on the Gardner-Holdt scale, and the hydroxyl numbers are all corrected for acidity. Where the use of cobalt drier is described, sufficient of a 2% cobalt naphthenate solution has been used to give the indicated content of cobalt metal, this proportion being based on the oil.

The ester compositions in the titles of each example are an index to the proportion of super-drying acid radicals in the product; i. e., they do not mean the product actually contains the stated percentage of, for example, the compounds linseed acids glyceride and hexadien-2,4-oic acid glyceride. To illustrate, a product referred to as having 40% super-drying acid glyceride and 60% linseed acids glyceride is a product prepared from proportions of reactants so chosen as to yield a mixture of the two mentioned glycerides in the stated proportions by weight, theoretically, i. e., if it be assumed no mixed ester is formed. Actually, such a product is considered to be composed principally of mixed glycerides, probably mixtures of mixed glycerides, though small amounts of simple glycerides, partial glycerides (i. e., glycerol incompletely esterified), free glycerol, and free acids are undoubtedly present. The significance of the super-drying acid ester content is discussed following the examples.

EXAMPLE 1

*Glycerol mixed ester of linseed oil acids and 2-methylhexadien-2,4-oic acid*

|  | Per cent |
|---|---|
| 2-methylhexadien-2,4-oic acid glyceride | 19.1 |
| Linseed acids glyceride | 80.9 |

Alkali-refined linseed oil, 1300 parts, is agitated for 2 hours at 225° C. in an atmosphere of pure nitrogen with 69.4 parts of dry glycerol in a reactor fitted with a stirrer, thermometer, and nitrogen inlet tube. The partial glyceride thus prepared, 93 parts, is stirred for 12 hours at 215-220° C. in the presence of nitrogen with 21 parts of 2-methylhexadien-2,4-oic acid,

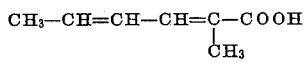

(Jaworski, Ber. 35, 3637; 1902), and 10 parts of toluene. Provision is made for condensing the toluene and water which distill from the solution, separating the water, and returning the condensed toluene to the reaction vessel. The solution is cooled, filtered, and the solvent removed at 100° C. and 10 mm. pressure during a period of 1 hour. The mixed glyceride, chemical composition as above, has the following physical and analytical values: $N_D^{25}$, 1.4918; $d_4^{25}$, 0.9662; hydroxyl No. 24.8; iodine No. 147.9; saponification No. 214.8; acid No. 8.5; viscosity N.

Films of this product containing 0.03% cobalt drier become tack-free at 25° C. in 7-8 hours; under similar conditions linseed oil remains definitely tacky. Dried films are light-colored, hard, and tough, being comparable in properties to perilla and China-wood oil varnishes containing rosin or ester gum.

EXAMPLE 2

*Glycerol mixed ester of linseed oil acids and hexadien-2-4-oic acid—Preparation from super-drying acid*

|  | Per cent |
|---|---|
| Hexadien-2,4-oic acid glyceride | 17.5 |
| Linseed acids glyceride | 82.5 |

Alkali-refined linseed oil, 1500 parts, is agitated for 1 hour at 225° C. in an atmosphere of nitrogen with 79.6 parts of dry glycerol and 0.2 part of litharge. This partial glyceride is stirred for 11.5 hours at 210–240° C. with 302 parts of hexadien-2,4-oic acid, $$CH_3-CH=CH-CH=CH-COOH$$

(M. P. 132–4° C.) (Doebner, Ber. 33, 2140, (1900)), and 80 parts of xylene, employing the continuous esterification apparatus previously described. After cooling, removal of solvent by heating in vacuo, and filtering, there is obtained an oil, chemical composition as above, having the following physical and analytical values: $N_D^{25}$, 1.4897; $d_4^{25}$, 0.9664; hydroxyl No. 22.0; iodine No. 152.6; saponification No. 193.4; acid No. 7.6; viscosity P; color 3.2.

With 0.03% cobalt, this oil dries in 8–10 hours over substrates such as wood or steel; whereas linseed oil is still tacky after the same period of time. On baking, for example at 100° C., drying is much faster, and, if desired, driers can be eliminated. The films are hard, glossy and adherent, and are similar in many respects to those obtained from China-wood oil-limed rosin varnishes or perilla oil-"Amberol" varnishes of about 45-gallon oil length. Exposures over steel and undercoats after 8 months in Delaware returned durability superior to the above varnish controls.

The above product can be made into a resin-oil varnish as follows: The oil is first boiled to a viscosity greater than Z-6 by heating under nitrogen at 290° C. for 2.5 hours. This bodied oil, 214 parts, and 61.8 parts of a 15% phenolic resin modified ester gum are heated in 10 minutes to 232° C. and held 10 minutes at 232° C., after which a slurry of 1.1 parts of hydrated lime and 9.0 parts of litharge, 9 parts of the unbodied oil, and 1.3 parts of a manganese resinate are added. The temperature is again brought to 232° C. momentarily, after which the mixture is allowed to cool to 150° C. and 294.6 parts of a hydrocarbon thinner slowly introduced. The solution is filtered and allowed to stand at 25° C. for 5 days, after which it is ready for use as a varnish. Films dry in 10–15 hours at 25° C. and are light in color, clear, and of a hardness comparable to films from China-wood oil-"Amberol" and perilla oil-"Amberol" varnishes of 45-gallon oil length. Durability after 8 months in Delaware (45° south exposure) is superior to that of these controls.

The product of Example 2 can be made into an enamel as follows: Fifty parts of the oil, 25 parts of titanium oxide, 25 parts of antimony oxide, and 10 parts of aromatic hydrocarbon solvent are ground in a pebble mill for 5 days. To the resulting grind is added a further 15 parts of hydrocarbon solvent along with cobalt and lead naphthenate solutions in such amounts as to give 0.03% cobalt and 0.3% lead, based on the coil. This enamel dries in 10–15 hours at 25° C., the films being clear, tack-free, and hard. Durability after 8.5 months exposure in Delaware was excellent.

A similar black enamel can be prepared by grinding in a pebble mill for 4 days a mixture of 7 parts carbon black, 100 parts of the oil, and 70 parts of "Hi-flash" naphtha. This product, in the presence of 0.03% cobalt and 0.3% lead drier, dries overnight at 25° C. to hard, glossy, tack-free films.

EXAMPLE 3

*Glycerol mixed ester of linseed oil acids and hexadien-2,4-oic acid—Preparation from super-drying acid chloride*

|  | Percent |
|---|---|
| Hexadien-2,4-oic acid glyceride | 12.5 |
| Linseed acids glyceride | 87.5 |

Alkali-refined linseed oil, 131.8 parts, is agitated at 205–207° C. for 1.5 hours under a nitrogen atmosphere with 4.7 parts of glycerol and 0.1 part of litharge. To 60 parts of the partial glyceride thus prepared are added 7.9 parts of pyridine, then, with cooling and stirring and in small portions, 13 parts of hexadien-2,4-oic acid chloride. After the solution has stood under nitrogen for 16 hours, it is taken up in a mixture of 200 parts of water and 144 parts of ether, the ether layer then being separated and washed twice with 10% aqueous sodium sulfate, once with dilute sodium bicarbonate, and finally with water, after which it is dried over anhydrous magnesium sulfate, filtered, and the ether removed under reduced pressure. There is obtained a reddish-colored oil of low viscosity, chemical composition as above, which has the following physical and analytical values: $N_D^{25}$, 1.4925; $d_4^{25}$, 0.9550; hydroxyl No. 16.0; iodine No. 185; saponification No. 231; acid No. 4.1; viscosity A.

With 0.03% cobalt, this product dries in 16 hours at 25° C., and after 0.5 hour at 100° C., the films being hard, glossy, and water-resistant. In drying ability and many film properties, this product is comparable to commercial rosin and ester gum varnishes, and is particularly valuable in that films of high build can be obtained with a minimum number of coats because of the high solids content at working viscosities (above 90% as compared to about 50% or less for many commercial materials). In other words, there is combined in the product the film build of the natural oils with the drying ability and hardness of resin-oil varnishes.

EXAMPLE 4

*Glycerol mixed ester of soya bean oil acids and hexadien-2,4-oic acid*

|  | Percent |
|---|---|
| Hexadien-2,4-oic acid glyceride | 17.5 |
| Soya bean acids glyceride | 82.5 |

Refined soya bean oil, 565 parts, is agitated at 250° C. for 2 hours under deoxidized nitrogen with 30 parts of glycerol. The diglyceride thus formed is cooled to 150° C., 113.5 parts of hexadien-2,4-oic acid added, and the mixture heated for 5.5 hours at 220–235° C. under nitrogen in the presence of 26 parts of xylene. After removal of the xylene by heating in vacuo, there is obtained a light yellow self-drying oil, chemical composition as above, having the following physical and analytical values: $N_D^{25}$, 1.4842; $d_4^{25}$, 0.9696; hydroxyl No. 28.5; iodine No. 126.4; saponification No. 216.0; acid No. 10.5; viscosity N; color 3.2.

With 0.03% cobalt drier flowouts of the product become dust-free in about 15 hours at 25° C.; under similar conditions, soya bean oil shows little or no evidence of drying. Dried films are much harder, tougher, and more durable than linseed oil films.

Instead of soya bean oil, mixtures of soya bean oil and linseed oil can be used to prepare mixed glycerides having similar or superior properties.

EXAMPLE 5

*Pentaerythritol mixed ester of coconut oil acids and hexadien-2,4-oic acid*

| | Percent |
|---|---|
| Coconut oil acids ester of pentaerythritol | 65.5 |
| Hexadien-2,4-oic acid pentaerythritol ester | 34.5 |

Pentaerythritol, 27 parts, 50 parts of hexadien-2,4-oic acid, 100 parts of coconut oil fatty acids, and 20 parts of toluene are stirred in an atmosphere of nitrogen at 210–220° C. for 13 hours. After removal of the solvent and the excess acid, there is obtained a viscous oil, chemical composition as above, which possesses the following physical and analytical values: hydroxyl No. 20.2; iodine No. 36.5; saponification No. 262; acid No. 19.8.

This film dries slowly, but is outstandingly superior in drying properties to corresponding esters of coconut oil acids.

A lacquer prepared by blending this oil with an equal amount of nitrocellulose in butyl acetate solution dries very rapidly to hard, tough, light-colored films.

EXAMPLE 6

*Glycerol mixed ester of hexadien-2,4-oic acid and linseed oil acids*

| | Percent |
|---|---|
| Hexadien-2,4-oic acid glyceride | 46.0 |
| Linseed acids glyceride | 54.0 |

A glycerol mixed ester of hexadien-2,4-oic acid and linseed oil acids having 46% hexadienoic glyceride is prepared by heating together (under deoxidized nitrogen and in the presence of 12 parts of toluene) 96.4 parts linseed oil mono glyceride and 84 parts of hexadien-2,4-oic acid for 5.0 hours at 200° C. The solvent and excess hexadienoic acid are removed by blowing the hot mixture with pure nitrogen for 20–30 minutes. After filtration, the oil has the following physical and analytical values: $N_D^{25}$, 1.5027; hydroxyl No. 50.2; iodine No. 159.7; saponification No. 247.5; acid No. 53.8; viscosity above Z–6.

With 0.03% cobalt drier, this product sets up to the tack-free stage in 4–5 hours under atmospheric conditions, the films being very hard, tough, and glossy.

Thirty-five parts of the above oil is heated with 57 parts of linseed oil for 1 hour and 10 minutes at 200° C. under deoxidized nitrogen. The resulting product theoretically contains 17.5% hexadien-2,4-oic acid glyceride. It is believed that during the heating some interchange of linseed oil and the 46% ester takes place, since drying and film properties are somewhat better than those of a physical mixture (not heated) of these ingredients. The product is indeed similar in drying rate and film properties to that of Example 2, which also contains 17.5% of the glyceride of the same acid.

EXAMPLE 7

*Hexamethylene glycol mixed ester of hexadien-2,4-oic acid and linseed oil acids*

| | Per cent |
|---|---|
| Hexadien-2,4-oic acid ester | 32.3 |
| Linseed acids ester | 67.7 |

A mixture of 39 parts of hexamethylene glycol, 93 parts of linseed oil acids, and 37 parts of hexadien-2,4-oic acid is stirred in an atmosphere of deoxidized nitrogen at 200–220° C. for about 8 hours in the presence of 20 parts of toluene. After removal of the toluene by distillation and excess acid by nitrogen blowing, there is obtained an oily mixed ester, chemical composition as above, having the following physical and analytical values: $N_D^{25}$, 1.4849; $d_4^{25}$, 0.9638; hydroxyl No. 18.8; iodine No. 134.1; saponification No. 193.0; acid No. 12.9.

Films containing 0.03% cobalt drier and diluted to viscosity D with mineral spirits dry slowly to soft, flexible films. Under the same conditions, hexamethylene glycol di-linseed oil acids ester does not dry.

EXAMPLE 8

*Glycerol mixed ester of linseed oil acids and 4-ethyloctadien-2,4-oic acid*

| | Per-cent |
|---|---|
| 4-ethyloctadien-2,4-oic acid glyceride | 23.5 |
| Linseed acids glyceride | 76.5 |

To 47 parts of the glycerol diester of linseed oil acids is added 12.8 parts of 4-ethyloctadien-2,4-oic acid,

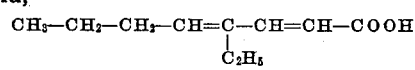

(B. P. 110–111° C./2 mm. and obtainable from reaction of 2-ethylhexenal and malonic acid in the presence of pyridine and piperidine), and 9 parts of toluene, the mixture then being heated as in previous examples for 14 hours at 200–220° C. After further heating at 150–180° C. under 2–5 mm. pressure to remove toluene and excess volatile acids, there is obtained an oil, chemical composition as above, having the following physical and analytical values: hydroxyl No. 12.4; acid No. 12.4; viscosity H; color 8.

With 0.1% cobalt drier, this product dries to the tack-free stage after about 16 hours at 100° C. and in 3–5 days at 25° C. Such films are superior to those from linseed oil controls, which remain tacky after the same period of drying.

EXAMPLE 9

*Glycerol mixed ester of linseed oil acids and 5,9-dimethyldecatrien-2,4,8-oic acid*

| | Per cent |
|---|---|
| 5,9-dimethyldecatrien-2,4,8-oic acid glyceride | 26.1 |
| Linseed acids glyceride | 73.9 |

To 44.5 parts of the glycerol diester of linseed oil acids are added 16.7 parts of 5,9-dimethyldecatrien-2,4,8-oic acid,

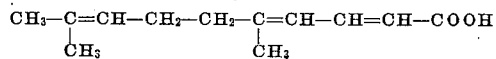

(obtainable by condensing citral with methyl acetate; B. P. 160° C./8 mm.) (Verley, Bull. Soc. Chim. (3), 21, 416 (1899)), and 9 parts of toluene. This mixture is heated as in previous examples for 13 hours at 200–210° C. After removing the toluene in a vacuum, there is obtained an oil, chemical composition as above, having the following physical and analytical values: $N_D^{25}$, 1.4936; hydroxyl No. 18.7; iodine No. 184.8; saponification No. 219.8; acid No. 17.2; viscosity E.

With 0.03% cobalt drier, this product dries over steel to the tack-free stage after about 15–18 hours at 25° C.

It will be noted that the examples given have as a part of their caption the amounts of polyhydric alcohol simple esters of each acid that are present in the products theoretically, i. e., with the assumption that no mixed esters are formed. The meaning of these figures is discussed hereinbefore.

It has been found that, for each particular combination of polyhydric alcohol, super-drying acid, and other monocarboxylic acids, there is a range of super-drying acid-polyhydric alcohol simple ester content within which the product dry fastest, have best film properties generally, and can be made most easily.

With glycerol, hexadien-2,4-oic acid, and linseed oil acids, this range is from about 15% to about 50% of the hexadien-2,4-oic acid glyceride. As the amount is lowered to 0%, the drying time increases, approaching and reaching that of linseed oil, although for many purposes low proportions can be used advantageously. As the amount is increased from about 50%, the products are increasingly difficult to prepare, at least in part because of the increasing tendency to gelation, and the films tend to become more brittle.

In regard to the glycerol mixed esters of super-drying acids generally, and more particularly in regard to glycerol mixed esters of super-drying acids and drying or semi-drying oil acids (especially linseed or soya bean oil acids), it will usually be found that the most valuable products are obtained from that proportion of super-drying acid which gives a product theoretically having on the order of 5-60% super-drying acid glyceride. However, the exact best range should be determined for each super-drying acid.

After the film-forming properties of esters obtained from different proportions of a particular polyhydric alcohol, super-drying acid, and other monocarboxylic acid have been determined by simple testing, it is possible to prepare, by appropriate selection of proportions, a polyhydric alcohol mixed ester having any desired degree of improvement in film-forming properties (up to the maximum possible for the ingredients involved) as compared to the polyhydric alcohol simple ester of the acid other than the super-drying acid. More specifically, where the polyhydric alcohol is glycerol and the other acid is drying or semi-drying oil acids, it is possible, by appropriate selection of proportions, to prepare a mixed glyceride having any desired degree of improvement in film properties (up to the maximum possible for the ingredients involved) as compared to the drying or semi-drying oil whose acids are being used.

Thus, from soya bean oil, glycerol, and hexadien-2,4-oic acid, it is possible to make oils that in drying ability and film properties are at least equal (5-10% hexadien-2,4-oic acid glyceride) or definitely superior (above 10% hexadien-2,4-oic acid glyceride) to linseed oil.

Similarly, it is possible to make, from linseed oil, glycerol, and a super-drying acid, oils which are equal to or better than oils which are superior to linseed oil. For example, a glycerol mixed ester of hexadien-2,4-oic acid and linseed oil acids having only 5% hexadien-2,4-oic acid glyceride becomes the equal of dehydrated castor oil; one having about 15% of the hexadien-2,4-oic acid glyceride is like China-wood oil; and those having more than 15% of the hexadien-2,4-oic acid glyceride are superior to China-wood oil. In the case of perilla and oiticica oils, which are intermediate in drying properties between linseed and China-wood oils, an introduction of about 2-5% hexadien-2,4-oic acid glyceride makes them about the equal of, and more than 5% makes them superior to, China-wood oil. Using China-wood oil, even low amounts of super-drying acids produce extensive improvements in drying rate, hardness, and strength.

A remarkable characteristic of those of the new oils which are in the China-wood oil drying range is that they dry to clear, smooth films and do not frost, crystallize, or wrinkle as does China-wood oil.

The mixed esters of the present invention can be made by reacting the polyhydric alcohol with the super-drying acid (or an esterifiable derivative) and with the other monocarboxylic acid or acids (or their esterifiable derivatives), simultaneously or successively in any order. Or a polyhydric alcohol simple ester of either the super-drying acid or the other acid or acids can be reacted successively with additional polyhydric alcohol and the remaining acid or acids; in the first, i. e., alcoholysis, step of this latter process, an ester interchange catalyst such as litharge, sodium hydroxide, sodium glycerolate, etc., is preferably included in small amount, suitably from 0.001% to 1.0%. A still further method which can be employed very satisfactorily in certain cases involves heating the super-drying acid, polyhydric alcohol, and an ester of the other acid, preferably the polyhydric alcohol ester. Catalysts can be used if desired.

Suitable types of esterifiable derivatives of both the super-drying acid and the different acid are the anhydride, an acid halide, and esters with alcohols more volatile than the polyhydric alcohol whose ester is to be prepared.

Solvents and other preparative details should be adjusted to the method chosen, the method of so doing being apparent to one skilled in the art. When the solution method heretofore discussed is to be used, any inert water-immiscible liquid which dissolves the product is suitable, hydrocarbons being preferable, and the amount of the solvent can be varied as desired. Suitable specific solvents include toluene, xylene, cymene, amyl benzene, tetrachloroethane, anisol, and cyclohexanone. Aromatic hydrocarbons, chlorinated solvents, ethers, and ketones are suitable in general. A boiling point in the range 100-200° C. is desirable.

In addition to glycerol, hexamethylene glycol and pentaerythritol, other polyhydric alcohols can be used in the present invention, such as methyltrimethylolmethane, erythritol, p,p'-di-(2-hydroxyethyl)benzene, decamethylene glycol, diethylene glycol, sorbitol, and cyclohexyl-1,2-dicarbinol.

Any monofunctional monocarboxylic acid, not having the super-drying acid structure as hereinbefore explained, can be employed in conjunction with the super-drying acid. Other monofunctional monocarboxylic acids that can be used include the following: perilla oil acids, oiticica oil acids, lauric acid, p-toluic acid, crotonic acid, corn oil acids, cottonseed oil acids, quinolinic acid, alpha-naphthionic acid, oleic acid, stearic acid, phenoxyacetic acid, and the like. The acids may be aromatic or aliphatic; open or closed chain and, if the latter, monocyclic, polycyclic, homocyclic, or heterocyclic; saturated or unsaturated; straight or branched chain; and substituted or not by other groups or atoms, such as ether, ketone, halogen, etc., which do not interfere with the desired esterification reaction.

Any super-drying acid, as the term is hereinbefore explained can be employed. The table below gives other specific suitable acids by name, formula and source.

ALTERNATIVE SUPER-DRYING ACIDS

| Name of acid | Formula | Source |
|---|---|---|
| Octatrien-2,4,6-oic | $CH_3CH=CH-CH=CH-CH=CH-COOH$ | $CH_3CH=CH-CH=CH-CHO$ + $H_2C(COOH)_2$ + pyridine |
| 7-phenylheptatrien-2,4,6-oic | $C_6H_5CH=CH-CH=CH-CH=CH-COOH$ | $C_6H_5CH=CH-CH=CH-CHO$ + $H_2C(COOH)_2$ |
| $\Delta^{1,3}$-cyclopentadienecarboxylic | (cyclopentadiene ring with $-COOH$) | (cyclopentadienone) + $K_2CO_3$ |
| 5-cyclohexylpentadien-2,4-oic | $C_6H_{11}-CH=CH-CH=CH-COOH$ | $C_6H_{11}-CH=CH-CHO$ + $H_2C(COOH)_2$ |
| 3-($\Delta^{1,3}$-cyclohexadienyl) propenoic | (cyclohexadienyl)$-CH=CH-COOH$ | (cyclohexadiene)$-CHO$ + $CH_2(COOH)_2$ |
| Octatrien-2,4,6-carboxylic acid-4 | $CH_3-CH=CH-CH=C(COOH)-CH=CH-CH_3$ | $CH_3CH=CH-CHO$ + $CH_3CH=CH-CHBr-COOC_2H_5$ + Zn |
| 2-phenylhexadien-2,4-oic | $CH_3CH=CH-CH=C(C_6H_5)-COOH$ | $CH_3CH=CH-CHO$ + $C_6H_5CHBr-COOC_2H_5$ + Zn |
| 4-methylheptadien-2,4-oic | $CH_3CH_2CH=C(CH_3)-CH=CH-COOH$ | $C_2H_5CH=C(CH_3)-CHO$ + $CH_2(COOH)_2$ |
| 5,9-dimethyldecatrien-2,4,8-oic | $(CH_3)_2C=CH-CH_2CH_2-C(CH_3)=CH-CH=CH-COOH$ | Citral + $CH_2(COOH)_2$ |
| Beta-ionylideneacetic | (beta-ionylidene)$-C=CH-C=CH-COOH$ | Beta-ionone + $BrCH_2COOC_2H_5$ |
| 3,5-dimethylhexadien-2,4-oic | $CH_3-C(CH_3)=CH-C(CH_3)=CH-COOH$ | $(CH_3)(CH_3)C=CH-C(O)-CH_3$ + $BrCH_2COOC_2H_5$ + Zn |
| 2-furylhexadien-2,4-oic | $CH_3CH=CH-CH=C(furyl)-COOH$ | $CH_3CH=CH-CHO$ + (furyl)$CHBr-COOC_2H_5$ + Zn |
| 5-(2-furyl)pentadien-2,4-oic | (furyl)$-CH=CH-CH=CH-COOH$ | (furyl)$-CH=CH-CHO$ + $H_2C(COOH)_2$ |

The examples and general description indicate that the new oils of the present invention are generally useful for formulation into coating compositions, which latter can also contain—as needed and desired for the particular purpose to which they are to be put—natural resins; synthetic resins; cellulose derivatives such as nitrocellulose and cellulose acetate; waxes; natural drying oils; other oils; pigments; fillers; cork; bitumens; solvents; etc. The new oils react toward driers in a manner generally similar to linseed oil. Driers and solvents which are effective with natural drying oils work well with the new oils, although, if very light-colored products are to be made, lead driers are undesirable.

These compositions can be applied to many kinds of surfaces and materials, e. g., metal, wood, paper, linen, silk, cotton textiles, regenerated cellulose wrapping foil, etc. Specific manufactures that can be so produced are linoleum, patent leather, linoxyn-type materials, coated copper wire, oiled cloth, oiled silk, and sandpaper. The products of the invention can also be made up into molding compositions, putties, and the like. In addition, they can be employed as modifying agents for urea-formaldehyde and phenol-formaldehyde resins.

It will be apparent from the foregoing description that new mixed esters having remarkable properties and a wide utility have been obtained. In particular, these esters are valuable substitutes for the natural drying oils in coating compositions, thereby reducing materially the dependence upon these natural products. The new esters have also many advantageous properties not shared by the natural oils, as for example, the ability to form films which do not crystallize, wrinkle, or frost, as do films from the more rapidly drying natural oils. Furthermore, it is possible to take any fatty oil, including one that has a low order of drying, and by substituting a part of the fatty acid making up that oil by a superdrying acid, to improve greatly the drying ability and film properties. Another especially outstanding characteristic of the new oils is that they combine the high film build of the natural oils with the ability of resin-oil varnishes to dry rapidly to hard, tough films.

It is apparent that many widely different embodiments of this invention may be made without departing from the spirit and scope thereof; and, therefore, it is not intended to be limited except as indicated in the appended claims.

I claim:

1. A polyhydric alcohol mixed ester of a monocarboxylic acid having ethylenic double bonds in the 2 and 4 positions in which the ethylenic carbon atoms that are in direct conjugation with the carboxyl group are each attached to no more than one hydrogen atom, and a monofunctional monocarboxylic acid of different structure.

2. A polyhydric alcohol mixed ester of a monocarboxylic acid having ethylenic double bonds in the 2 and 4 positions in which the ethylenic carbon atoms that are in direct conjugation with the carboxyl group are each attached to no more than one hydrogen atom, and a natural fatty oil acid.

3. A polyhydric alcohol mixed ester of a monocarboxylic acid having ethylenic double bonds in the 2 and 4 positions in which the ethylenic carbon atoms that are in direct conjugation with the carboxyl group are each attached to no more than one hydrogen atom, and a natural drying oil acid.

4. A glycerol mixed ester of a monocarboxylic acid having ethylenic double bonds in the 2 and 4 positions in which the ethylenic carbon atoms that are in direct conjugation with the carboxyl group are each attached to no more than one hydrogen atom, and a natural drying oil acid.

5. The ester of claim 1 containing that proportion of radicals of said first-mentioned acid which theoretically gives a content of polyhydric alcohol simple ester of that acid in the range of about 5–60% by weight.

6. The ester of claim 4 containing that proportion of radicals of said first-mentioned acid which theoretically gives a content of glycerol simple ester of that acid in the range of about 5–60% by weight.

7. The ester of claim 4 containing that proportion of radicals of said first-mentioned acid which theoretically gives a content of glycerol simple ester of that acid in the range of about 5–60% by weight, and said second-mentioned acid being linseed oil acid.

8. A composition consisting essentially of a mixed ester of a polyhydric alcohol and a plurality of monocarboxylic acids, one of said acids being a monocarboxylic acid in which ethylenic double bonds are in the 2 and 4 positions and in which the ethylenic carbon atoms that are in direct conjugation with the carboxyl group are each attached to no more than one hydrogen atom, the remaining acid or acids being monofunctional, monocarboxylic, unsaturated, and of a different structure.

9. A coating composition containing the product of claim 1.

10. A varnish containing the product of claim 1, a drier, and a varnish solvent.

11. An enamel containing the product of claim 1, a pigment, a drier, and a volatile solvent.

12. The method which comprises reacting an acid of the group which consists of (1) monocarboxylic acids having ethylenic double bonds in the 2 and 4 positions in which the ethylenic carbon atoms that are in direct conjugation with the carboxyl group are each attached to no more than one hydrogen atom and (2) monofunctional monocarboxylic acids of different structure, with a polyhydric alcohol partially esterified with the other type of acid.

13. The method which comprises reacting a polyhydric alcohol partial ester of a natural fatty oil acid with a monocarboxylic acid having ethylenic double bonds in the 2 and 4 positions in which the ethylenic carbon atoms that are in direct conjugation with the carboxyl group are each attached to no more than one hydrogen atom.

14. The method of improving the drying of natural fatty oils which comprises reacting these oils successively with a polyhydric alcohol and a monocarboxylic acid having ethylenic double bonds in the 2 and 4 positions in which the ethylenic carbon atoms that are in direct conjugation with the carboxyl group are each attached to no more than one hydrogen atom.

15. A polyhydric alcohol mixed ester, the acidic radicals of which comprise a monocarboxylic acid having ethylenic double bonds in the 2 and 4 positions in which the ethylenic carbon atoms that are in direct conjugation with the carboxyl group are each attached to no more than one hydrogen atom, and a monofunctional monocarboxylic acid of different structure.

MARTIN E. CUPERY.